(12) United States Patent
Bogdahn

(10) Patent No.: US 8,317,120 B2
(45) Date of Patent: Nov. 27, 2012

(54) MOUNTING FOR A ROPE PULLEY

(75) Inventor: Manfred Bogdahn, Hamburg (DE)

(73) Assignee: Flexi-Bogdahn Technik GmbH & Co. KG, Bargteheide (DE)

( * ) Notice: Subject to any disclaimer, the term of this patent is extended or adjusted under 35 U.S.C. 154(b) by 553 days.

(21) Appl. No.: 12/109,513

(22) Filed: Apr. 25, 2008

(65) Prior Publication Data
US 2008/0276882 A1 Nov. 13, 2008

(30) Foreign Application Priority Data
May 10, 2007 (DE) .................... 20 2007 006 648 U

(51) Int. Cl.
*B65H 75/48* (2006.01)
(52) U.S. Cl. ......... 242/376; 242/379; 242/612; 119/796
(58) Field of Classification Search ................. 242/376, 242/379.1, 379.2, 385, 385.1, 588, 612, 613, 242/614; 119/796
See application file for complete search history.

(56) References Cited

U.S. PATENT DOCUMENTS

| | | | |
|---|---|---|---|
| 2,314,504 A | 3/1943 | Lifchultz | |
| 2,919,676 A | 1/1960 | Schneider | |
| 3,099,250 A | 7/1963 | Soles, Jr. | |
| 3,693,596 A | 9/1972 | Croce et al. | |
| 3,794,258 A * | 2/1974 | Posso et al. | 242/608.8 |
| 3,853,283 A | 12/1974 | Croce et al. | |
| D235,026 S | 4/1975 | Bogdahn | |
| 3,937,418 A | 2/1976 | Critelli | |
| 4,328,766 A | 5/1982 | Deibert | |
| 4,402,472 A | 9/1983 | Burtscher | |
| 4,501,230 A | 2/1985 | Talo | |
| 4,537,215 A | 8/1985 | Roman | |
| 4,562,792 A | 1/1986 | Pak et al. | |
| 5,251,476 A * | 10/1993 | Gilmore et al. | 73/73 |
| 5,377,626 A | 1/1995 | Kilsby et al. | |
| 5,483,926 A | 1/1996 | Bogdahn | |
| 5,595,143 A | 1/1997 | Alberti | |
| 5,683,054 A * | 11/1997 | Chen | 242/376 |
| D392,429 S | 3/1998 | Plewa et al. | |
| 5,890,456 A | 4/1999 | Tancrede | |
| 6,148,773 A | 11/2000 | Bogdahn | |
| D439,302 S | 3/2001 | Plewa | |
| D448,892 S | 10/2001 | Hans | |
| 6,526,918 B1 | 3/2003 | Arnold | |
| D519,246 S | 4/2006 | Plewa | |
| 7,168,393 B2 | 1/2007 | Bogdahn et al. | |
| 2007/0022975 A1* | 2/2007 | Arnold | 119/796 |
| 2008/0011895 A1 | 1/2008 | Bleshoy | |

FOREIGN PATENT DOCUMENTS

| | | |
|---|---|---|
| DE | 100 35 583 A1 | 4/2001 |
| DE | 201 08 777 U1 | 9/2001 |
| DE | 20 2005 005 752 U1 | 1/2006 |
| DE | 10 2005 031 527 A1 | 1/2007 |
| EP | 0550856 B1 | 7/1995 |
| EP | 0863103 B1 | 9/1998 |
| WO | WO 2008/025349 * | 3/2008 |

* cited by examiner

*Primary Examiner* — William A Rivera
(74) *Attorney, Agent, or Firm* — Howson & Howson LLP

(57) ABSTRACT

A mounting for a rope pulley is arranged so that the pulley can rotate on an axle in a housing. The rope pulley has a projection, which points in the direction toward the axle and which engages in a peripheral gap to guide the rope pulley in an axial direction on the axle.

16 Claims, 1 Drawing Sheet

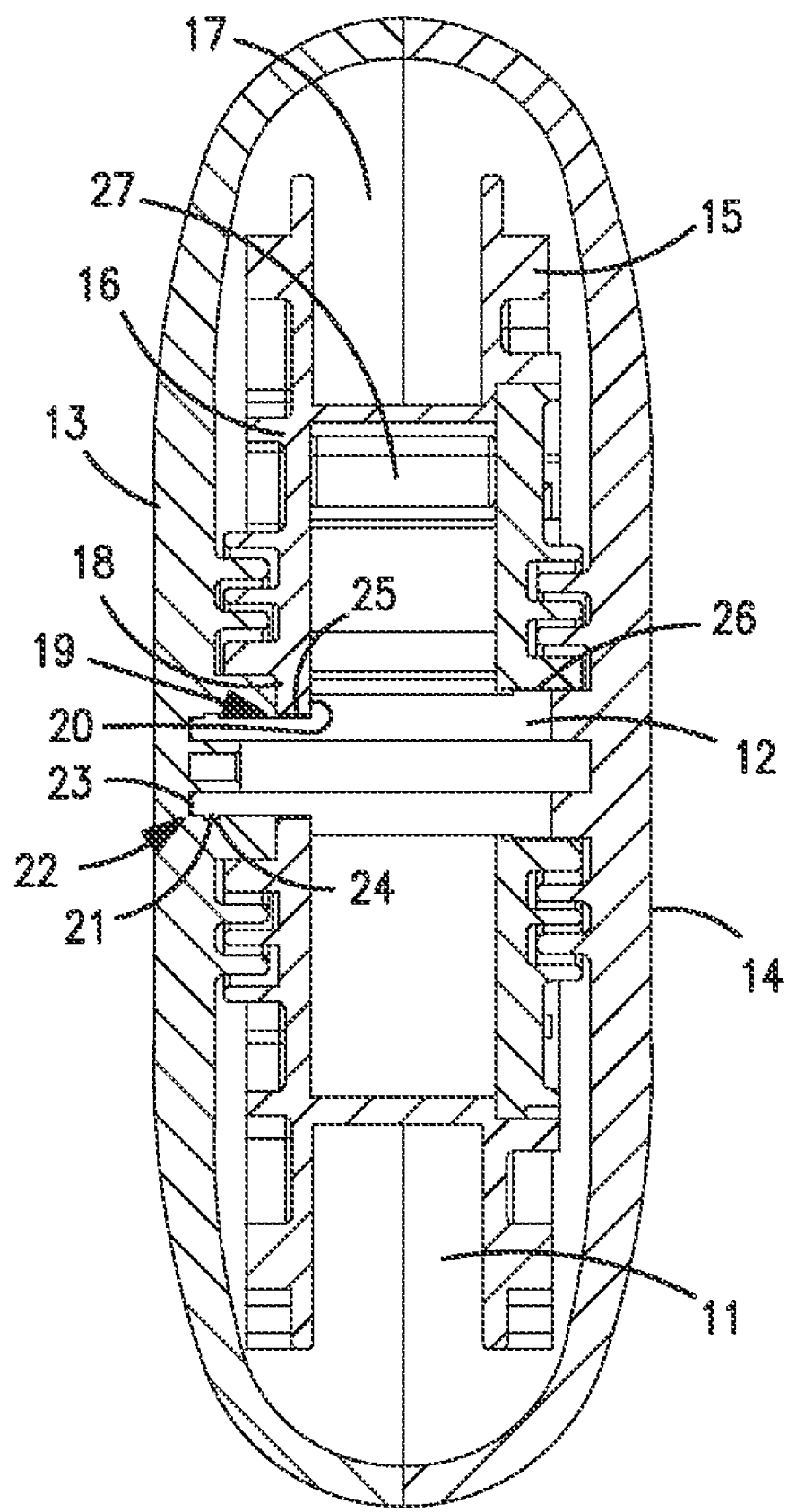

MOUNTING FOR A ROPE PULLEY

BACKGROUND OF THE INVENTION

The invention relates to a mounting for a rope pulley, which is arranged so that it can rotate on an axle in a housing. In particular, the invention relates to a mounting for a rope pulley of a mechanical leash that can be wound up and unwound for leading animals.

Such a leash is known, for example, from EP 0 941 657 B1. The leash has a two-part housing, in which a rope pulley is mounted so that it can rotate on an axle. The leash can be unwound from the rope pulley against the force of a spring and pulled out from the housing. Due to the tensioned spring, the leash automatically winds up onto the rope pulley. The leash can be realized as a rope with an approximately round cross section or as a flat belt. The following primarily discusses a rope, but there is no limitation associated with this.

Usually, the arrangement is realized in such a way that a housing part has the axle on which the rope pulley can rotate. After placing the rope pulley on the axle, the other housing part is set on and connected to the first housing part. A closed housing is formed with an outlet opening for the leash. The rope pulley is guided axially between the two housing parts.

For smooth running, it is necessary that the rope pulley be held with relatively little play between the housing parts. The rope pulley is frequently made from polyamide, while the housing is made from another plastic. When using such a leash, it is unavoidable that the leash will be wound up also in a wet state. This leads to expansion of the rope pulley, so that the rope pulley can become jammed between the housing parts. The spring force is then not always sufficient to wind up the leash quickly and without any problems. This usually involves only minimal expansion, which is sufficient, however, to prevent the running of the rope pulley due to the required low axial play of the rope pulley and its axial width. Trouble-free running of the rope pulley, especially in the wet state, is not always guaranteed.

SUMMARY OF THE INVENTION

The invention is based on the problem of forming a mounting of the type named above in such a way that trouble-free running is also possible for a rope pulley that has become swollen due to moisture.

The problem is solved according to the invention in that the rope pulley has a projection, which points in the direction toward the axle and which engages in a peripheral gap in order to guide the rope pulley axially on the axle. In this way, it is achieved that for the same coefficient of expansion in the rope pulley, the absolute expansion remains small despite the resulting expansion in the axial direction. Actually, only the projection engaging in the gap expands relative to the housing material. The absolute axial expansion dimension remains small accordingly. In this way, the axial play in the assembly of the dry rope pulley can be kept small, without there being the risk that the housing parts will become jammed for a moist rope pulley.

The projection can be realized as individual or plural tabs entering the gap in the radial direction. Preferably, the projection has a peripheral construction. In particular, the projection can be realized as an extension pointing inward in the radial direction of a side flange of the rope pulley. Such a projection can be produced easily during the course of the production of the rope pulley.

The gap is located in the region of the axle. It can be provided that the peripheral gap is formed by an axial spacing between a shoulder of the axle and a housing part. In this way, the assembly of the leash is simplified, because the axle has no undercut through the gap. Instead, the gap is formed between the shoulder of the axle and the mounted housing part.

It is favorable when the housing has a housing top part and a housing bottom part, wherein the axle is connected to one housing part and engages, in the assembled position, in the other housing part and has a shoulder, whose radial end face is at an axial distance to the other housing part while forming the peripheral gap. In this way, the leash remains easy to assemble. Also, the rope pulley can be inserted easily, because the projection pointing inwardly lies on the shoulder and the thinner end of the axle runs through the remaining opening of the rope pulley, in order to engage in the other housing part.

Furthermore, it is useful when, in the assembled state, the axial dimension of the axial distance between the shoulder and the housing part is slightly greater than the axial width plus the axial expansion of the projection of the rope pulley. Then, trouble-free running of the rope pulley is also guaranteed in the wet state. The maximum expansion is dependent on the material and can be determined.

The material that the cable pulley on the one hand and the housing on the other are made from is basically arbitrary. The problem arises particularly when the rope pulley and the housing parts have different coefficients of expansion. The rope pulley can be made from polyamide. The housing can be produced from a different plastic.

It can be provided that the axle is a component of the housing bottom part and is inserted with its free end into a receptacle of the housing top part. The housing bottom part can thus be produced with an injection molding process.

It is further favorable when the axle is inserted with a predetermined length into the receptacle and limits the axial distance. In particular, the length of the axle or the depth of the receptacle could be dimensioned so that the free end face of the axle contacts against the axial boundary of the receptacle in the axial direction. The gap is thus formed between the shoulder and the inner boundary of the housing part turned toward this shoulder. The insertion depth of the axle into the receptacle is further limited in this way and a gap with a defined axial width can be produced in a simple and reproducible way. Also, the functional elements are also formed in the production, and subsequent machining is not necessary. The gap thus always has the desired axial dimension.

BREIF DESCRIPTION OF THE DRAWINGS

The invention is explained in more detail below with reference to the schematic drawing.

FIG. 1 is a cross sectional view through a leash housing of the present invention with a rope pulley mounted in the housing so that it can rotate.

DETAILED DESCRIPTION OF THE INVENTION

The leash shown in the drawing can be formed as a leash that can be wound up and unwound for guiding animals. A rope pulley 11 is provided, which is mounted on an axle 12 so that it can rotate. The axle is a component of a housing part 13, which forms a closed housing for the rope pulley 11 with a different housing part 14 lying opposite the first housing part. The axle can also be formed, however, as a separate component and can be connected, for example, to a housing part.

The rope pulley has two flanges 15, 16, which are spaced apart laterally and which form, between themselves, a space 17 for winding up the leash (not shown). The rope pulley 11 can be unrolled against the force of a spring 27 (not shown in more detail) and can be wound up again due to the spring force. The spring is usually formed as a spiral spring. The rope pulley 11 is usually made from polyamide, while the housing parts 13, 14 are made from a different plastic. In this respect, the shown leash assembly corresponds to a known leash assembly for guiding animals and requires no further explanation.

The rope pulley 11 is guided radially on the axle 12. In detail, the arrangement is realized in such a way that the rope pulley is supported with the hub on the fixed axle 12 at two or more positions 25, 26 spaced apart from each other in the axial direction. Through this radial mounting of the rope pulley at two positions of the axle 12 spaced apart from each other in the axial direction, smooth running of the rope pulley is achieved. In particular, tilting or off-track running of the rope pulley on the axle is prevented.

For the axial guidance, the rope pulley has a projection 18, which points inwardly toward the axle and which runs in a peripheral gap 19. In detail, the arrangement is realized in such a way that the gap is formed between a shoulder 20 of the axle 12 and a housing part 13. The axle 12 extends into a concentric opening 22 of the housing part 13. At the free end 23 of the axle there are radial projections 21, which engage in a corresponding groove 24 in the opening in the housing part 13. In this way, the housing parts 13, 14 are connected to each other in the axial direction.

For the embodiment shown in the drawing, the inner annular peripheral surface of the projection 18 is supported in the radial direction on the axle 12 and thus forms one radial bearing 25 for the rope pulley 11. The other opposing radial bearing 26 is formed by the side flange 15, whose inner annular surface is similarly supported on the axle 12. On the fixed axle 12 there is also a mounting for the retaining spring 27 of the rope pulley 11, in order to allow unwinding against the spring force and winding up due to the tensioned spring.

Furthermore, the insertion depth of the axle is limited by these projections, so that the gap obtains a defined axial dimension. It can also be provided that the depth of the opening 22 and the length of the free end of the axle are selected in such a way that the end face of the axle contacts the bottom of the opening. Then a defined axial dimension of the gap could also be achieved.

The rope pulley is supported in the radial direction on the thicker section of the axle. In the axial direction, the rope pulley is supported in the assembled position shown in the drawing with the projection 18 within the gap 19. The projection can have a peripheral construction and is supported with its inner peripheral face on the thinner section of the axle. In this way, another radial mounting of the rope pulley on the axle is realized.

The assembly of the leash is realized in that first the rope pulley 11 is placed on the axle 12 of the housing bottom part 14. Then the inner face of the projection 18 contacts the shoulder 20 of the axle. Optional spring mechanisms are then already assembled and the rope is located on the rope pulley or is anchored there. Then the top housing part 13 is placed on top. The leash is guided outwardly from an opening of the housing. The free end of the axle locks in place when inserted into the opening 22. Screws or other locking elements can be provided, in order to securely connect the housing parts 13, 14.

In the assembled position, the gap is formed between the shoulder 20 of the axle 12 and the housing part 13. The gap and the projection can be manufactured very precisely with simple means, so that the projection can be held in the gap with little play. A secure and low-noise running of the rope pulley in the housing is achieved.

The invention claimed is:

1. A leash assembly having a leash that can be wound up and unwound for use in guiding animals, comprising:
    a pulley (11) arranged on an axle (12) so that said pulley (11) can rotate about said axle (12) within a housing (13, 14),
    said pulley (11) having a different coefficient of expansion due to moisture than said housing (13, 14) such that said pulley (11), when in a wet state, expands relative to said housing (13, 14),
    said axle (12) having a thicker section and a thinner section, said thinner section having a smaller diameter relative to said thicker section and a shoulder (20) is formed where said thinner section transitions into said thicker section;
    said pulley (11) having a hub supported on said axle (12) at two spaced-apart radial bearing locations including a location (26) on said thicker section of said axle (12) and a location (25) on said thinner section of said axle (12),
    said pulley (11) having a projection (18) that extends in a direction toward said axle (12), has an inner annular peripheral surface engaging said thinner section of said axle (12), and extends within a gap (19) in a circumferential recess defined between said shoulder (20) of said axle (12) and an opposed annular flange extending integrally and inward in an axial direction from said housing toward said shoulder (20) such that said shoulder (20) and annular flange define opposite peripheral closed ends of said gap (19) between which said projection (18) extends to guide said pulley (11) in an axial direction on said axle (12) and restrict axial play of said pulley (11) relative to said housing (13, 14),
    said gap (19) between said shoulder (20) and said opposed annular flange of said housing having an axial width such that in a wet state of the pulley (11) the projection (18) of the pulley (11) does not become jammed within the gap (19) and such that in the dry state of the pulley (11) axial play between the pulley and the housing is restricted, and
    when said projection (18) engages against said opposed annular flange of said housing, a remainder of said pulley (11) remains spaced in an axial direction from said housing (13, 14) in a manner permitting continued rotation of said pulley (11) about said axle (12).

2. A leash assembly according to claim 1, wherein said projection (18) is constructed as an extension directed inward in a radial direction of a lateral flange (16) of said pulley (11).

3. A leash assembly according to claim 1, wherein said housing (13, 14) has a first housing part (13) and a second housing part (14), wherein said axle (12) is connected to said second housing part (14) and engages in an assembled position with said first housing part (13).

4. A leash assembly according to claim 3, wherein said axle (12) is a component of the second housing part (14) and is inserted with its free end (23) into a receptacle (22) of the first housing part (13).

5. A leash assembly according to claim 4, wherein said axle (12) has a predetermined length that is inserted into said receptacle (22) and that limits said axial dimension of said gap (19).

6. A leash assembly according to claim 1, wherein said pulley (11) is made of polyamide.

7. A leash assembly according to claim 6, wherein said housing (13, 14) is made from plastic.

8. A leash assembly according to claim 7, wherein said axle (12) is a component of the second housing part (14) and is inserted with its free end (23) into a receptacle (22) of the first housing part (13).

9. A leash assembly according to claim 8, wherein said axle (12) has a predetermined length that is inserted into said receptacle (22) and that limits said axial dimension of said gap (19).

10. A leash assembly according to claim 9, wherein said projection (18) is constructed as an extension directed inward in a radial direction of a lateral flange (16) of said pulley (11).

11. A leash assembly according to claim 1, wherein said annular flange of said housing which forms one of the closed ends of said gap (19) is a first annular flange, wherein said housing has a second annular flange extending integrally and inward in an axial direction from said housing toward said pulley (11) such that said second annular flange is concentric with said first annular flange and has a greater diameter than that of said first annular flange, and wherein said second annular flange is spaced further away from an opposed surface of said pulley (11) in an axial direction than said first annular flange is spaced from said projection (18).

12. A leash assembly according to claim 11, wherein said housing has a third annular flange extending integrally and inward in an axial direction from said housing toward said pulley (11) such that said third annular flange is concentric with said first and second annular flanges and has a greater diameter than said first and second annular flanges, and wherein said third annular flange is spaced further away from an opposed surface of said pulley (11) in an axial direction than said first annular flange is spaced from said projection (18).

13. A leash assembly according to claim 11, wherein said pulley (11) has an annular flange extending integrally and outward in an axial direction from said pulley (11) toward said housing between said first and second annular flanges of said housing such that said annular flange of said pulley (11) is concentric with said first annular flange of said housing and has a diameter greater than that of said first annular flange of said housing and less than that of said second annular flange, and wherein said annular flange of said pulley (11) is spaced further away from an opposed surface of said housing in an axial direction than said projection (18) of said pulley (11) is spaced from said first annular flange of said housing.

14. A leash assembly having a leash that can be wound up and unwound for use in guiding animals, comprising:
   a pulley arranged on an axle within a housing such that said pulley is spaced from said surrounding housing to enable the pulley to be rotatable about said axle, said pulley being made of a different material than said housing and having a different coefficient of expansion due to moisture than said housing such that said pulley expands relative to said housing when in a wet state as compared to when in a dry state;
   said axle having a thicker section and a thinner section, said thinner section having a smaller diameter relative to said thicker section and a shoulder is formed where said thinner section transitions into said thicker section;
   said pulley having a hub supported on said axle at two spaced-apart radial bearing locations including a location on said thicker section of said axle and a location on said thinner section of said axle, said pulley having a projection with an inner annular peripheral surface engaging said thinner section of said axle, said projection extending within a gap formed between said shoulder of said axle and an opposed annular flange extending integrally and inward in an axial direction from said housing toward said shoulder such that said shoulder and opposed annular flange of said housing define opposite peripheral closed ends of said gap in which said projection extends to restrict axial movement of said projection on said axle, when said projection engages against said opposed annular flange of said housing, a remainder of said pulley remains spaced in an axial direction from said housing in a manner permitting rotation of said pulley about said axle;
   in a wet state, said projection is prevented from becoming jammed within the gap since the axial width of the gap is greater than an axial width of said projection plus expected axial expansion of said projection of said pulley when in a wet state, said gap being greater than the axial width of said projection plus the expected axial expansion of said projection only to an extent required to prevent said projection from becoming jammed in said gap so that in the dry state axial play between the pulley and the housing is restricted.

15. A leash assembly according to claim 14, wherein said housing includes a first housing part and a second housing part, wherein said axle is connected to said second housing part and engages in an assembled position with said first housing part.

16. A leash assembly according to claim 15, wherein said pulley is made of polyamide and said housing is made from plastic.

* * * * *